United States Patent
Leung et al.

(10) Patent No.: US 8,868,474 B2
(45) Date of Patent: Oct. 21, 2014

(54) ANOMALY DETECTION FOR CLOUD MONITORING

(75) Inventors: Henry Leung, Alberta (CA); Siyue Chen, Alberta (CA)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/997,886

(22) PCT Filed: Aug. 1, 2012

(86) PCT No.: PCT/US2012/049101
§ 371 (c)(1),
(2), (4) Date: Jun. 25, 2013

(87) PCT Pub. No.: WO2014/021881
PCT Pub. Date: Feb. 6, 2014

(65) Prior Publication Data
US 2014/0040174 A1    Feb. 6, 2014

(51) Int. Cl.
*G06F 15/18*  (2006.01)
*G06F 11/30*  (2006.01)
*G06F 11/08*  (2006.01)
*G06N 99/00*  (2010.01)
*G06F 9/46*   (2006.01)

(52) U.S. Cl.
CPC .............. *G06N 99/005* (2013.01); *G06F 11/30* (2013.01); *G06F 11/08* (2013.01); *G06F 9/46* (2013.01)
USPC .......................................................... 706/12

(58) Field of Classification Search
CPC combination set(s) only.
See application file for complete search history.

(56) References Cited

U.S. PATENT DOCUMENTS

| | | | |
|---|---|---|---|
| 7,424,619 B1 | 9/2008 | Fan et al. | |
| 7,710,318 B2 * | 5/2010 | Wang et al. | 342/357.42 |
| 7,917,811 B2 * | 3/2011 | Yamamoto | 714/44 |
| 8,078,854 B2 * | 12/2011 | Vick et al. | 712/244 |
| 8,086,823 B2 * | 12/2011 | Hattori et al. | 711/209 |
| 8,201,026 B1 * | 6/2012 | Bornstein et al. | 714/45 |
| 8,255,522 B2 * | 8/2012 | Marwah et al. | 709/224 |
| 8,312,202 B1 * | 11/2012 | Koryakin et al. | 711/6 |
| 8,356,285 B2 * | 1/2013 | Schuba et al. | 717/127 |
| 8,359,496 B1 * | 1/2013 | Bornstein et al. | 714/45 |
| 8,400,471 B2 * | 3/2013 | Leung | 345/633 |
| 8,416,263 B2 * | 4/2013 | Leung | 345/633 |
| 8,442,502 B2 * | 5/2013 | Leung | 455/414.2 |
| 8,555,279 B2 * | 10/2013 | Nonaka et al. | 718/1 |
| 8,610,771 B2 * | 12/2013 | Leung et al. | 348/143 |
| 8,655,040 B2 * | 2/2014 | Leung | 382/131 |

(Continued)

OTHER PUBLICATIONS

A. Boschetti et al "TVI: a visual querying system for network monitoring and anomaly detection." Proceedings of the 9th international symposium on visualization for cyber security, Jul. 20, 2011.

(Continued)

*Primary Examiner* — Michael B Holmes
(74) *Attorney, Agent, or Firm* — Turk IP Law, LLC

(57) ABSTRACT

Technologies are presented for anomaly detection in a cloud environment using a sparsity measure. In some examples, cloud metric data may be gathered and processed into a dictionary base. Linear transform coefficients for a test sample may then be calculated from the dictionary base using $l_1$-norm minimization. A sparsity measure may then be computed from the linear transform coefficients. If the sparsity measure does not exceed a predefined threshold, the test sample may be determined as anomalous.

21 Claims, 7 Drawing Sheets

(56) References Cited

U.S. PATENT DOCUMENTS

| | | | |
|---|---|---|---|
| 8,677,124 B2* | 3/2014 | Lafon et al. | 713/168 |
| 8,688,620 B2* | 4/2014 | Viswanathan et al. | 706/62 |
| 8,712,558 B2* | 4/2014 | Ingels et al. | 700/22 |
| 2003/0236652 A1 | 12/2003 | Scherrer et al. | |
| 2010/0048242 A1 | 2/2010 | Rhoads et al. | |
| 2010/0153785 A1 | 6/2010 | Keromytis et al. | |
| 2010/0176952 A1 | 7/2010 | Bajcsy et al. | |
| 2010/0192024 A1 | 7/2010 | Middleton et al. | |
| 2012/0136909 A1 | 5/2012 | Wang et al. | |

OTHER PUBLICATIONS

Kind et al "Hisogram-based traffic anomaly detection," IEEE Tansactons on Nework and Sevice Management vol. 6, No. 2, pp. 110-121, Jun. 2009.

Wang et al "Online Detection of Utility Cloud anomalies using metric distributions." IEEE Network Operations and Management Symposium pp. 96-103, Apr. 19-23, 2010.

http://www.ll.mit.edu/mission/communications/cyber/CSTcorpora/ideval/, Cyber Systems and Technology, DARPA Intrusion Detection Evaluation, Sep. 23, 2012.

Chen et al, "Atomic decomposition by basis pursuit," SIAM Review, vol, 43, No. 1, pp. 129-159, Feb.-Mar. 2001.

Ide et al, Eigenspace-based Anomaly Detection in Computer Systems, KDD '04 Proceedings of the tenth ACM SIGKDD international conference on Knowledge discovery and data mining, Aug. 22-25, 2004, pp. 440-449, Seattle WA.

www.hp.com/go/sim, HP Systems Insight Manager, Mar. 13, 2008.

www.ibm.com/tivoli, Cloud and Smarter Infrastructure, Jun. 7, 2012.

International Search Report and Written Opinion for PCT/US 12/49101 filed Aug. 1, 2012, mailed Feb. 2, 2013.

* cited by examiner

ANOMALY DETECTION FOR CLOUD MONITORING

BACKGROUND

This application is the National Stage filing of PCT Application Ser. No. PCT/US12/49101 filed on Aug. 1, 2012 and claims priority to the PCT application under 35 U.S.C. §371.

Unless otherwise indicated herein, the materials described in this section are not prior art to the claims in this application and are not admitted to be prior art by inclusion in this section.

The online detection of anomalous system behavior caused by operator errors, hardware/software failures, resource over/under-provisioning, and similar causes is one vital element of operations in large-scale data centers and utility clouds. Conventional detection methods currently used in industry are often based on setting thresholds. Threshold values may come from pre-defined performance knowledge or constraints (e.g., service level objectives (SLOs)) or from predictions based on long-term historical data analysis. Whenever any of the metric observation violates a threshold limit, an alarm of anomaly is triggered. Although this approach is simple for implementation and easy for visual presentation, they may not have sufficient robustness and scalability for utility cloud needs.

Therefore, as the scale and complexity of cloud-based software, applications, and workload patterns increases, anomaly detection methods for cloud monitoring should operate automatically at run time and without the need for prior knowledge about normal or anomalous behaviors. These anomaly detection methods should also be sufficiently general so as to apply to multiple levels of abstraction and sub-systems and for the different metrics used in large-scale systems. In addition, collection of status data may not always be successful and on time. Hence, anomaly detection should be robust enough to achieve a high detection rate while maintaining a low false positive rate under various scenarios, such as noise corruption or incomplete data collection.

SUMMARY

The present disclosure generally describes technologies for providing scalable and robust anomaly detection for cloud monitoring.

According to some example embodiments, a method for detecting anomalies in cloud monitoring may include collecting training samples from multiple metrics associated with operations of a cloud-based entity, forming a dictionary from the training samples, determining linear transform coefficients for a test sample using the dictionary, determining a sparsity measure of the linear transform coefficients for the test sample, and classifying the test sample as an anomaly if the sparsity measure is below a predefined threshold.

According to other example embodiments, a cloud-based datacenter configured to detect anomalies in cloud monitoring may include multiple virtual machines operable to be executed on one or more physical machines and a data center controller. The data center controller may be configured to collect training samples from multiple metrics associated with operations of the data center, form a dictionary from the training samples, determine linear transform coefficients for a test sample using the dictionary, determine a sparsity measure of the linear transform coefficients for the test sample, and classify the test sample as an anomaly if the sparsity measure is below a predefined threshold.

According to further example embodiments, a computer-readable storage medium may have instructions stored thereon for detecting anomalies in cloud monitoring. The instructions may include collecting training samples from multiple metrics associated with operations of a cloud-based entity, forming a dictionary from the training samples, determining linear transform coefficients for a test sample using the dictionary, determining a sparsity measure of the linear transform coefficients for the test sample, and classifying the test sample as an anomaly if the sparsity measure is below a predefined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
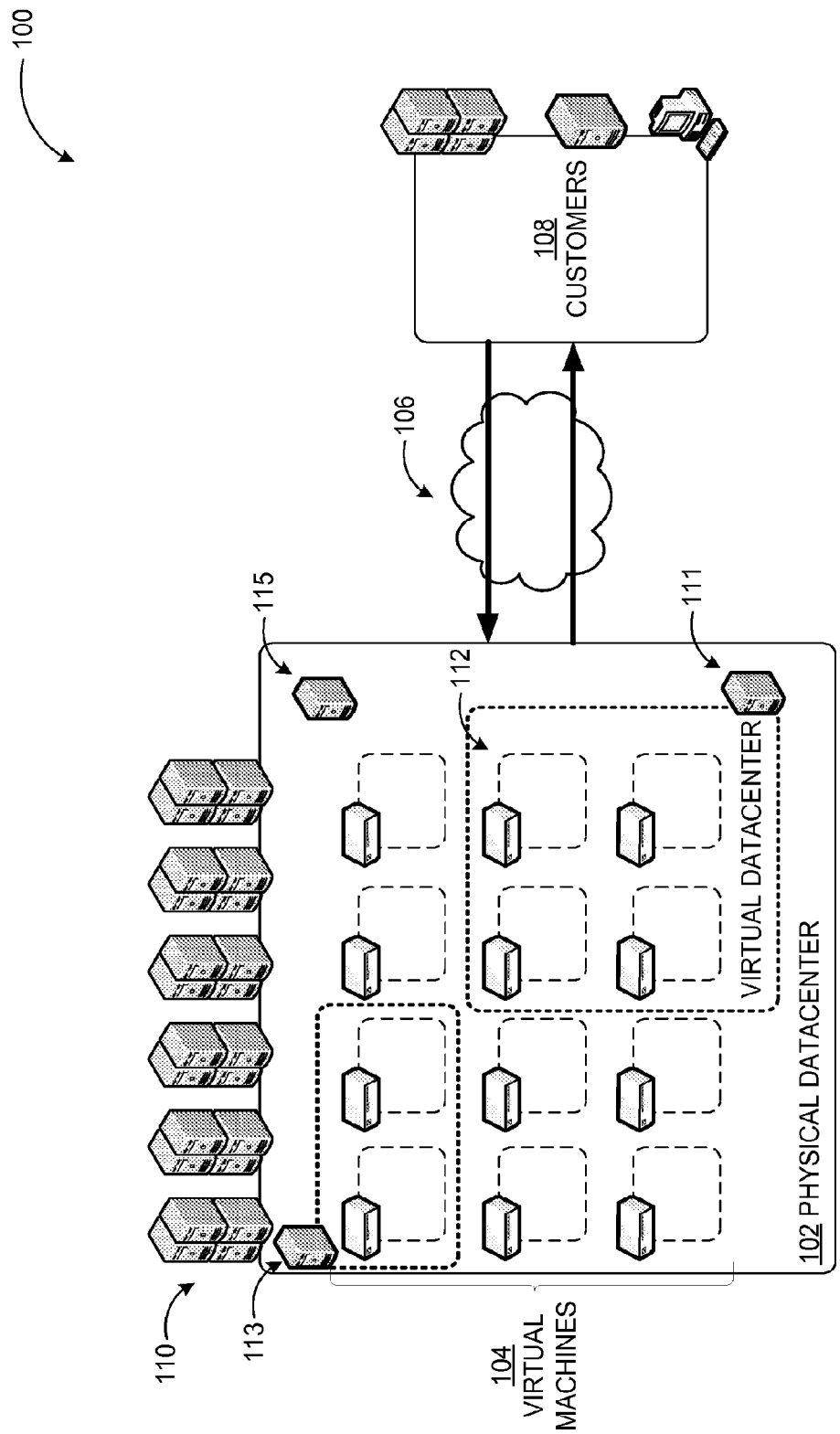
FIG. 1 illustrates an example system, where scalable and robust anomaly detection for cloud monitoring may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to robust and scalable detection of anomalies in cloud monitoring.

Briefly stated, technologies are presented for anomaly detection in a cloud environment using sparsity in a histogram-based analysis. In some examples, cloud metric data may be gathered and processed into a dictionary base. Linear transform coefficients for a test sample may then be calculated from the dictionary base using $l_1$-norm minimization. A sparsity measure may then be computed from the linear transform coefficients. If the sparsity measure does not exceed a predefined threshold, the test sample may be determined as anomalous.

FIG. 1 illustrates an example system where scalable and robust anomaly detection for cloud monitoring may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. Three physical servers are shown in FIG. 1 for simplicity and one skilled in the art will appreciate that the physical datacenter 102 may include a different number of physical servers. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Figure 2:
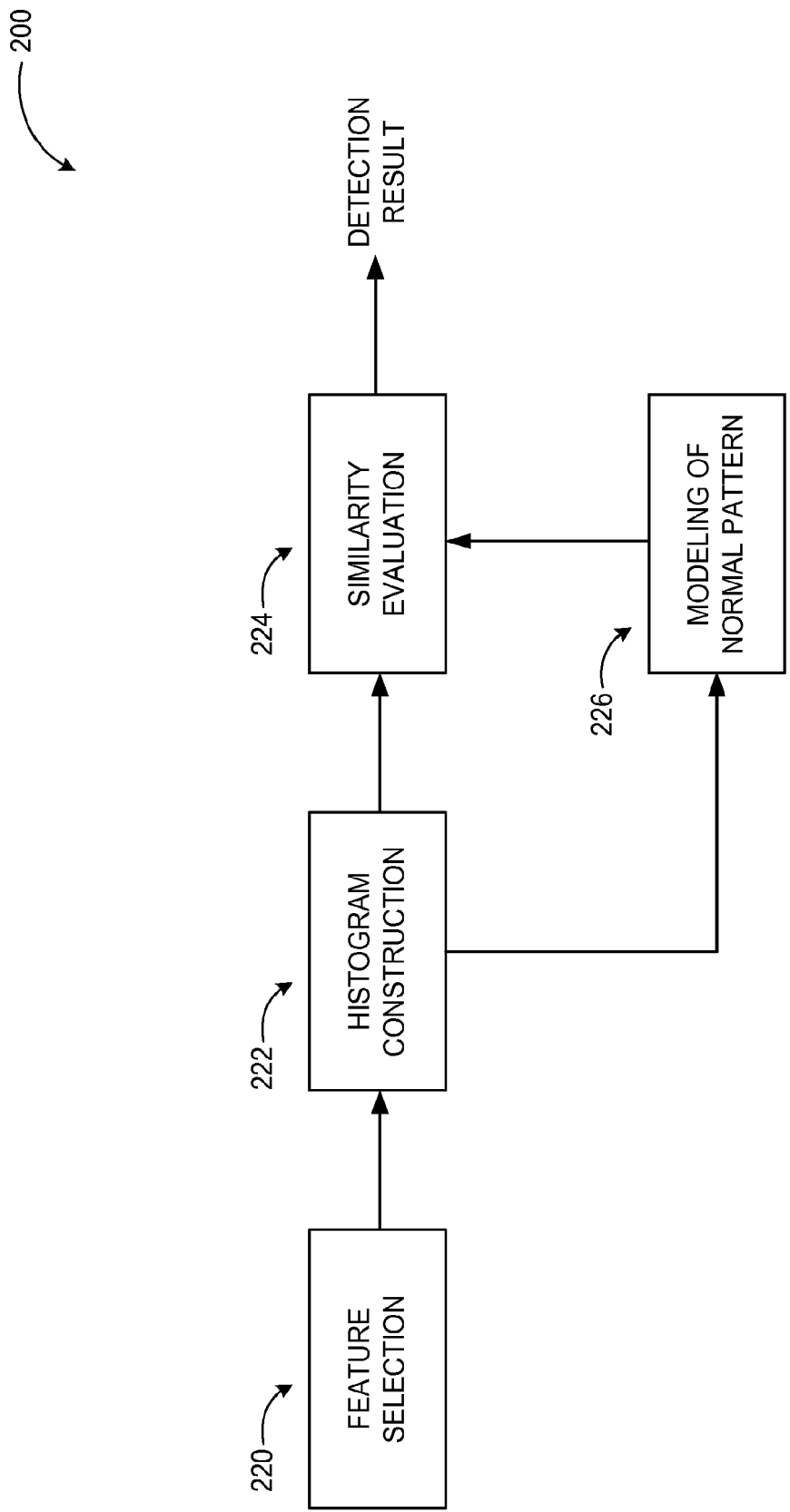
FIG. 2 is a flow diagram illustrating example actions in histogram-based anomaly detection.

As described above, threshold-based methods for anomaly detection may not have sufficient robustness and scalability for cloud environments, such as the physical datacenter 102 and/or the cloud 106 described above in FIG. 1. In order to address these issues, statistical methods using metric distributions may be employed to detect anomalies in operations of datacenters such as the data center 102 by a management application executed on one or more servers tasked with monitoring operations such as a server 115. The server 115 is shown in FIG. 1 for simplicity and one skilled in the art will appreciate that the physical datacenter 102 may include a different number of monitoring servers, or in some cases monitoring tasks may be distributed among other servers such as management servers. For example, measures of entropy may be used to compare differences between feature distributions of anomalies and normal behaviors. Entropy-based parameters may enable probability distributions to be condensed into a single value, which may then be used to compare certain qualitative differences of probability distributions in order to detect anomalies. For example, some attacks result in concentrating or dispersing probability distributions. Entropy-based parameters may reflect these changes in the concentration or dispersion of a probability distribution and thus may be suitable for identifying such shifts. However, since two completely different distributions may have the same entropy value, in some situations entropy-based parameters may not be able to identify significant differences between two distributions. Histogram-based methods may provide a way to overcome this shortcoming FIG. 2 is a flow diagram illustrating example actions in histogram-based anomaly detection, arranged in accordance with at least some embodiments described herein.

As shown in a diagram 200, a histogram-based anomaly detection process may begin with operation 220, in which one or more features to be analyzed for anomaly detection are selected. In some embodiments, the features may include CPU load/usage, memory usage, network traffic, or any other suitable parameter. In some embodiments, the features may include one or more features associated with a physical or virtual datacenter (e.g., the physical datacenter 102 or the virtual datacenter 112 in FIG. 1), a physical server (e.g., the servers 110, 111, and 113 in FIG. 1), and/or a virtual machine (e.g., the virtual machines 104 in FIG. 1).

Subsequently, in operation 222, one or more histograms of the features selected in operation 220 are constructed. In some embodiments, the data associated with each of the selected features may be analyzed and binned in a histogram based on a mean of the data, a range of the data, or any other suitable statistical measure of the data.

In operation 226, histograms constructed in operation 222 that correspond to normal situations (i.e., non-anomalous situations) may be used to model or train a pattern of normal situations. In some embodiments, the pattern may be modeled from the training histograms using principal component analysis, k-means clustering, or any suitable method.

In operation 224, the similarity of a test histogram (i.e., a histogram that is to be tested for anomalies) to the normal pattern modeled in operation 226 may then be evaluated to provide a test result 228. For example, a Euclidean distance may be computed from the test histogram to the normal pattern. If the computed Euclidean distance falls below a particular threshold, the test histogram may be deemed similar to the normal pattern, and therefore not anomalous. On the other hand, if the computed Euclidean distance falls above the threshold, the test histogram may not be similar to the normal pattern, and therefore represent an anomalous situation. The operations 220, 222, 224, and 226 may be performed by a management application executed on a monitoring server such as server 115 of FIG. 1. In other examples, one or more of the operations may be performed by distinct modules or applications executed on the same server or on different servers associated with the datacenter.

Figure 3:
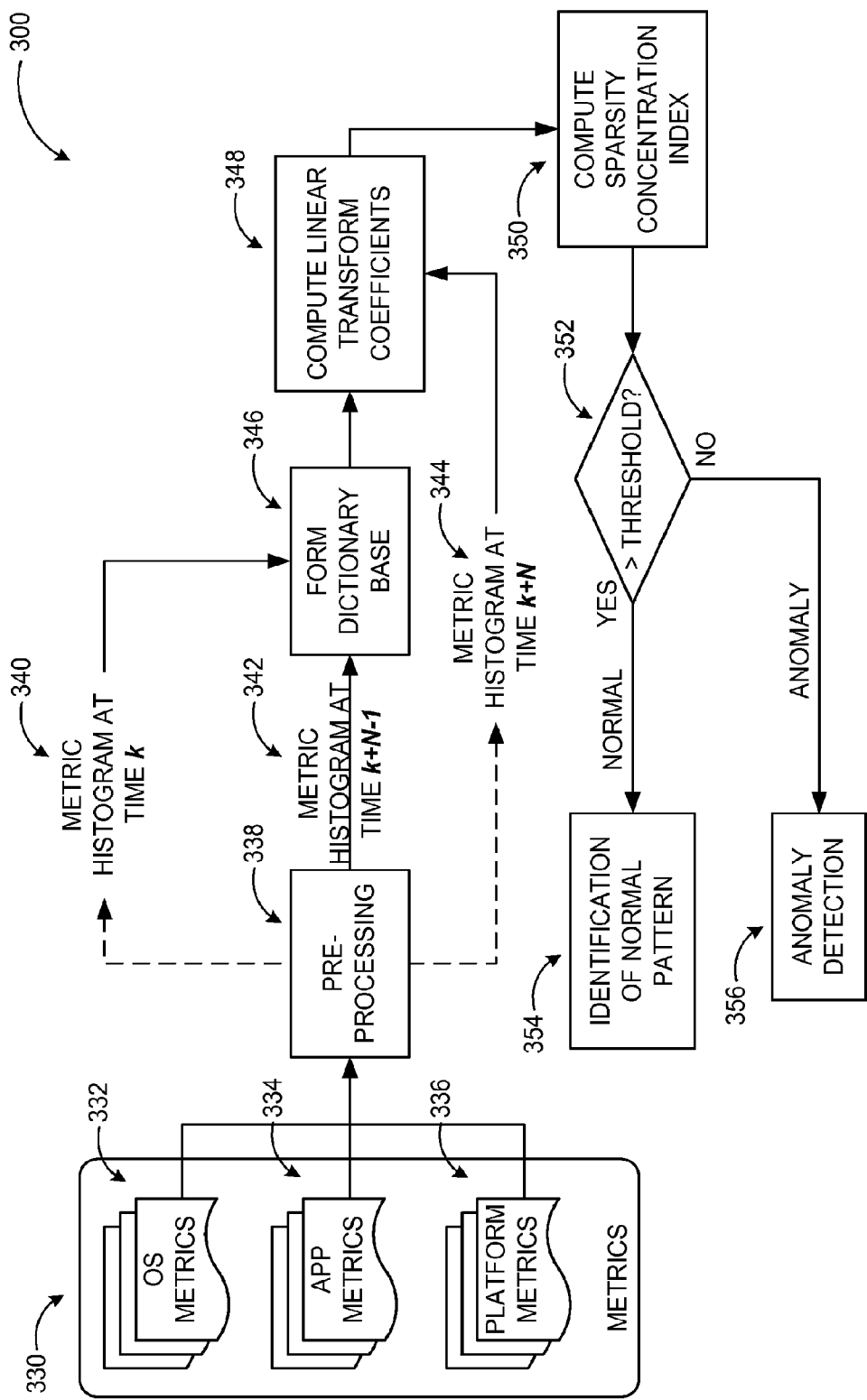
FIG. 3 illustrates an example block diagram of a system for detecting anomalies in cloud monitoring.

FIG. 3 illustrates an example block diagram of a system for detecting anomalies in cloud monitoring, arranged in accordance with at least some embodiments described herein. In contrast to many histogram-based anomaly detection methods, the system described in FIG. 3 uses training samples from normal patterns to construct an over-complete dictionary. To determine whether a test sample is anomalous, its linear transform coefficients may be computed from the over-complete dictionary by $l_1$-norm minimization. Finally, anomaly detection is performed by examining the sparsity of the linear transform coefficients. In some examples, the training samples may be obtained, the linear transform coefficients computed, and the anomaly(ies) detected by a management application executed on a monitoring server such as server 115 of FIG. 1. In other examples, one or more of the operations may be performed by distinct modules or applications executed on the same server or on different servers associated with the datacenter. Furthermore, the dictionary may be stored at a data store within (or external to) the datacenter. In some embodiments, all training samples from all normal patterns may be used to construct an over-complete dictionary.

Using an over-complete dictionary means that the coefficients are computed globally in terms of the training samples of normal patterns. This provides the ability to harness the joint distribution of normal patterns for validating whether a test sample is normal or not in the anomaly detection method. At the same time, the use of $l_1$-norm minimization mitigates over-fitting (which may lead to low anomaly detection rate) that might occur from using an over-complete dictionary, because the $l_1$-norm minimization penalizes linear transform coefficients with large norms. As a result, the actual (possibly multi-modal and nonlinear) distributions of the training samples over normal patterns may be used to assist in anomaly detection.

This approach is also readily scalable. Each hierarchy of a cloud may generate higher-level metric histograms from lower-level metric histograms, thereby reducing the volume of monitoring data as metric data volume grows. Also, since the computational complexity of linear transform coefficient vector calculation only increases linearly with dictionary size, this method scales readily with data set size.

Moreover, this anomaly-detection system does not need prior knowledge about hardware/software or of typical failure models. As a result, anomalies that are not well understood (i.e., no prior models) or have not been experienced previously may be detected, and the system may operate at one or across multiple levels of abstraction existing in modern systems, ranging from the hypervisor, to OS kernels, to middleware, and to applications.

As shown in a diagram 300, the system may begin by collecting available metrics 330 for particular time instances. The available metrics 330 may include operating system (OS) metrics 332, application metrics 334, and/or platform metrics 336, which may be associated with a physical or virtual datacenter (e.g., the physical datacenter 102 or the virtual datacenter 112 in FIG. 1), a physical server (e.g., the servers 110, 111, and 113 in FIG. 1), and/or a virtual machine (e.g., the virtual machines 104 in FIG. 1). The available metrics 330 may then be pre-processed by a pre-processing block 338 to generate one or more metric histograms 340, 342, and/or 344. In some embodiments, the pre-processing block 338 may generate metric histograms. Each of the metric histograms 340, 342, and/or 344 may correspond to a particular time instant. For example, the metric histogram 340 may represent a metric at time k, the metric histogram 342 may represent the metric at time k+N−1, and the metric histogram 344 may represent the metric at time k+N. While only three metric histograms are presented, more or fewer metric histograms may be generated by the pre-processing block 338. For example, metric histograms representing the metric at time k+1, k+2, k+N−3, k+N−2, or any other suitable time instant may be generated by the pre-processing block 338.

Each metric histogram generated by the pre-processing block 338 may include a vector with components corresponding to metric percentage values at each bin index. In block 346, a dictionary base may then be formed from one or more of the metric histograms generated by the pre-processing block 338. In some embodiments, the dictionary base for a particular time of interest may be formed from metric histograms associated with time instants before that time of interest. For example, suppose that a particular time of interest is k+N. Further suppose that the metric histograms generated by the pre-processing block 338 for time instants k to k+N−1 are denoted by $x_k, x_{k+1}, \ldots, x_{k+N-1}$. In some embodiments, block 346 may form the dictionary base X by stacking $x_k, x_{k+1}, \ldots, x_{k+N-1}$ (i.e., $X = [x_k, x_{k+1}, \ldots, x_{k+N-1}]'$). The dictionary base may be maintained by a buffer, and in some embodiments, the buffer may operate by first-in-first-out (FIFO). For example, if the time of interest is k+N, the dictionary base may include the metric histograms $x_k, x_{k+1}, \ldots, x_{k+N-1}$, whereas if the time of interest is k+N+1, the dictionary base may include the metric histograms $x_{k+1}, x_{k+1}, \ldots, x_{k+N}$. Thus, the FIFO buffer may slide metric histograms one by one during an anomaly monitoring process. This may be advantageous because (a) it may be impractical to maintain history data for large data sets, (b) shifts of work patterns may render old history data misleading or even useless, and (c) such a buffer may be implemented in high speed RAM, which may improve anomaly detection performance.

In block 348, the dictionary base formed in block 346 may be used to compute linear transform coefficients of the metric histogram 344 generated by the pre-processing block 338. The metric histogram 344 is associated with the time instant k+N, which in this particular example is the time instant of interest, which may be the current time instant. In other embodiments, the metric histogram 344 may be associated with other time instants, which in turn affects the dictionary base used to compute linear transform coefficients.

The metric histogram 344 may be denoted as $y_{k+N}$, and may be a linear combination of the elements of the dictionary base formed in block 346, represented by the equation $$y_{k+N} = AX, \quad [2]$$

where X is the dictionary base as defined above and A represents the linear transform coefficients. If $y_{k+N}$ falls into the $i^{th}$ metric histogram pattern in the dictionary (i.e., the $i^{th}$ dictionary element), its linear transform coefficients are expected to have the form $$A = [0, \ldots, 0, a_{i,1}, a_{i,2}, \ldots, a_{i,L}, 0, \ldots, 0]', \quad [3]$$

where most entries in A are zero except those associated with the $i^{th}$ dictionary elements. In other words, only those dictionary elements that are similar to $y_{k+N}$ will have their associated coefficients being non-zero while the other dictionary elements have their associated coefficients being zero or close to zero.

In block 350, a sparsity concentration index (SCI) may be computed for the linear transform coefficients from block 348. In general, the linear transform coefficients computed in block 348 for a test sample (corresponding to the metric histogram 344) should be sparse if the test sample falls into one of the normal patterns. For example, if the dictionary base formed in block 346 includes 10,000 patterns, about 0.0001% of the entries in the test sample may be nonzero, since the test sample may fall into one pattern out of the 10,000. However, if the test sample is not similar to a normal pattern or a combination of normal patterns, its linear transform coefficients may not be sparse. Therefore, anomaly detection may be performed by evaluating the sparsity of the linear transform coefficients for a particular test sample, instead of only evaluating the Euclidean distance. In some embodiments, the SCI computed in block 350 may be defined as $$SCI(A) = \frac{N * \max_i \left( \frac{\delta_i(A)}{\delta(A)} \right) - 1}{N - 1}, \quad [4]$$

where $\delta_i(A)$ returns the number of non-zero coefficients within $a_i = [a_{i,1}, a_{i,2}, \ldots, a_{i,L}]$, which corresponds to the $i^{th}$ dictionary elements, and $\delta_i(A)$ returns the total number of the non-zero coefficients in A. The value of SCI(A) may vary between 0 and 1. If SCI(A) equals 1, then the test sample can be completely represented by dictionary base element (i.e., a single metric histogram in the history). On the other hand, if SCI(A) equals 0, then the non-zero coefficients of the test sample are spread evenly across the dictionary base elements.

Subsequently, the test sample SCI computed in block 350 may be compared to a threshold in decision block 352. The threshold may be predefined, and may be application-specific and/or user-defined. If the test sample SCI exceeds the threshold, then the test sample may be considered a normal pattern in block 354. If the test sample SCI does not exceed the threshold, then the test sample is considered an anomaly in block 356.

Figure 4:
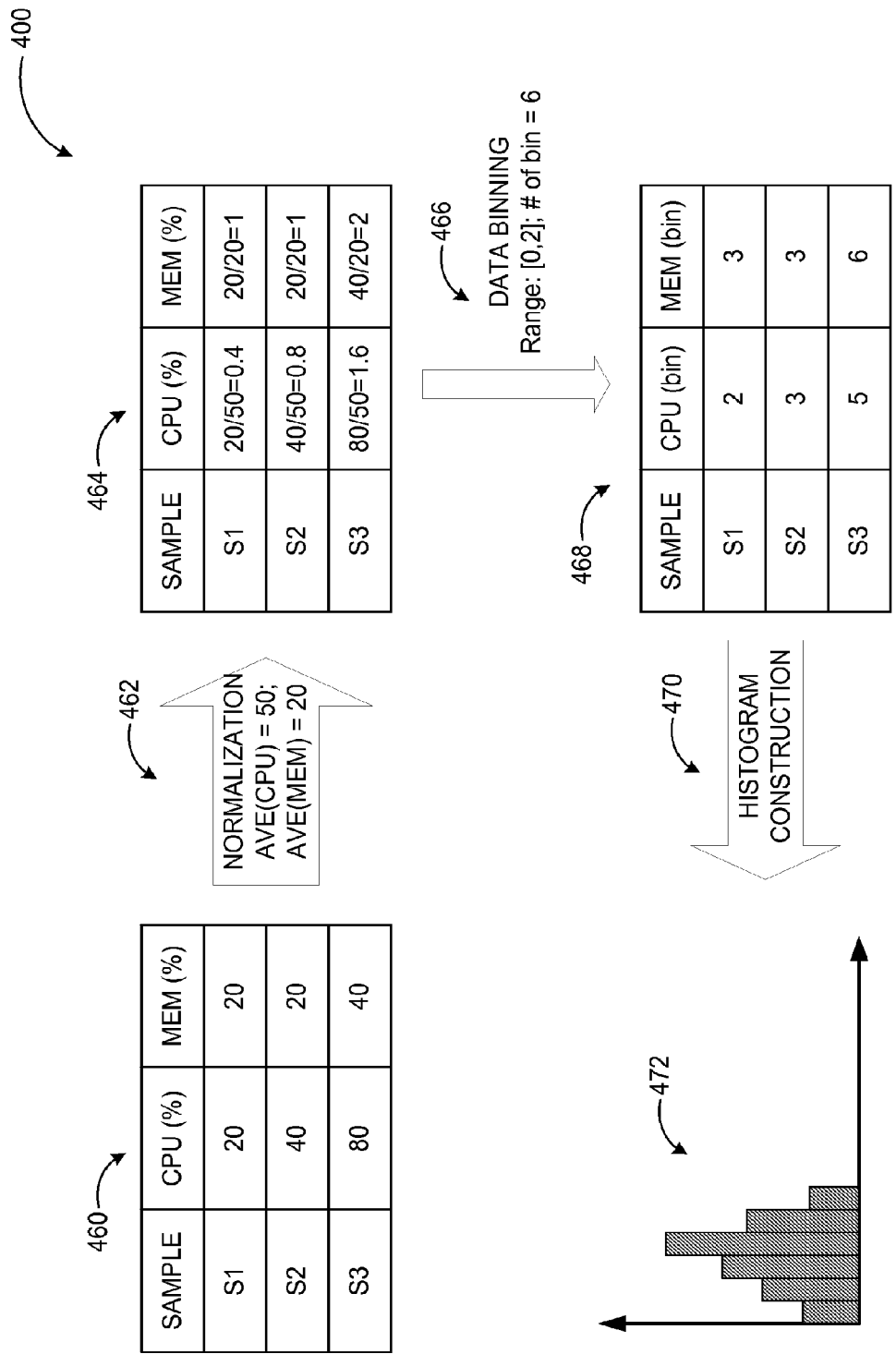
FIG. 4 illustrates example histogram-generating operations of a system for detecting anomalies in cloud monitoring.

FIG. 4 illustrates example histogram-generating operations of a system for detecting anomalies in cloud monitoring, arranged in accordance with at least some embodiments described herein.

As shown in a diagram 400, one or more histograms of available cloud metrics may be generated in preparation for anomaly detection. First, cloud metric sample values 460 may be collected from various sources such as the physical servers 110, 111, and 113 of FIG. 1. In some embodiments, the cloud metric sample values 460 may include CPU load/usage, memory usage, or any other relevant parameter or metric. In some embodiments, the cloud metric sample values 460 may include one or more parameters associated with a physical or virtual datacenter (e.g., the physical datacenter 102 or the virtual datacenter 112 in FIG. 1), a physical server (e.g., the servers 110, 111, and 113 in FIG. 1), and/or a virtual machine (e.g., the virtual machines 104 in FIG. 1). In operation 462, the cloud metric sample values 460 may first be normalized. For example, each sample value may be divided by the mean of values of the same type for a given time instant. This may result in normalized cloud metric sample values 464. In some embodiments, each sample value may be divided by the mean of all values of the same type for a given time constant.

In operation 466, the normalized cloud metric sample values 464 may be binned to create binned cloud metric sample values 468, where each normalized sample value is hashed to a data bin. In some embodiments, this may be done by first creating a series of data bins based on a value range and a data bin size and then assigning each normalized sample value to the appropriate bin. For example, a value range (e.g., from 0 to r) and a data bin size B may first be defined. The value range may be split into B-1 equal-sized bin indexed from 0 to B-2, and normalized sample values less than r assigned to the appropriate bin. Normalized sample values greater than r may be assigned to another bin, indexed B-1. The values r and B may be pre-determined statistically and/or may be configurable.

In operation 470, one or more metric histograms 472 may be constructed from the binned cloud metric samples 464. In some embodiments, a particular metric histogram may represent a particular metric at a particular time instant. The metric histogram 472 may have an x-axis denoting a bin index and a y-axis denoting a percentage of the total sample values for the individual bin index. One or more of the operations in the diagram 400 may be performed by a management application executed on a monitoring server such as server 115 of FIG. 1. The operations may also be performed by distinct modules or applications executed on the same server or on different servers associated with the datacenter.

As described above, histogram-based methods may be used to detect anomalies in cloud environments. In particular, similarity evaluation may play an important role in the histogram-based anomaly detection methods. Some approaches may evaluate similarity by computing the Euclidean distance (or the normalized Euclidean distance), which may be expressed by the equation:

$$d(y, x_i) = \|y - A_i x_i\|^2, \quad [1]$$

where y is the test sample and $x_i$ is the training sample from the $i^{th}$ pattern. If $d(y, x_i)$ is less than a pre-defined threshold, it may be determined that y is similar to the training sample $x_i$. Otherwise, y may not considered similar to $x_i$. If y is not similar to any existing pattern of normal situations, y may be determined as an anomaly.

However, there may be several drawbacks associated with this approach. First, in some embodiments $x_i$ may be a single training sample or multiple training samples from the $i^{th}$ pattern. When $x_i$ is a single training sample, using the Euclidean distance to evaluate similarity may result in relatively high false alarm rates, because even a slight derivation from $x_i$ may lead to $d(y, x_i)$ exceeding the threshold. In other words, a noise-corrupted version of $x_i$ may be wrongly determined as an anomaly. When $x_i$ includes multiple training samples, it will be much easier to have $d(y, x_i)$ less than the threshold, because $d(y, x_i)$ is usually obtained through searching $A_i$ that can minimize $d(y, x_i)$. In general, using more training samples may mean that $d(y, x_i)$ is more likely to be less than the threshold. Using multiple training samples to construct $x_i$ may therefore lead to the situation that an anomaly will be wrongly determined as normal.

Second, regardless of whether $x_i$ is a single training sample or multiple training samples, in many histogram-based anomaly detection methods these samples are generally only from one single normal pattern. The Euclidean distance in these cases may actually be computed without any knowledge of other normal patterns. Since a test sample may represent certain similarities across several patterns, many histogram-based approaches may not be able to determine which normal pattern the test sample belongs to, and quite often may treat the test sample as an anomaly, because the value of $d(y, x_i)$ may not be small enough to be less than the threshold. This will again increase the false alarm rate. Hence, there is a need to develop a more discriminative detector that has a high detection rate while maintaining a very low false alarm rate.

Figure 5:
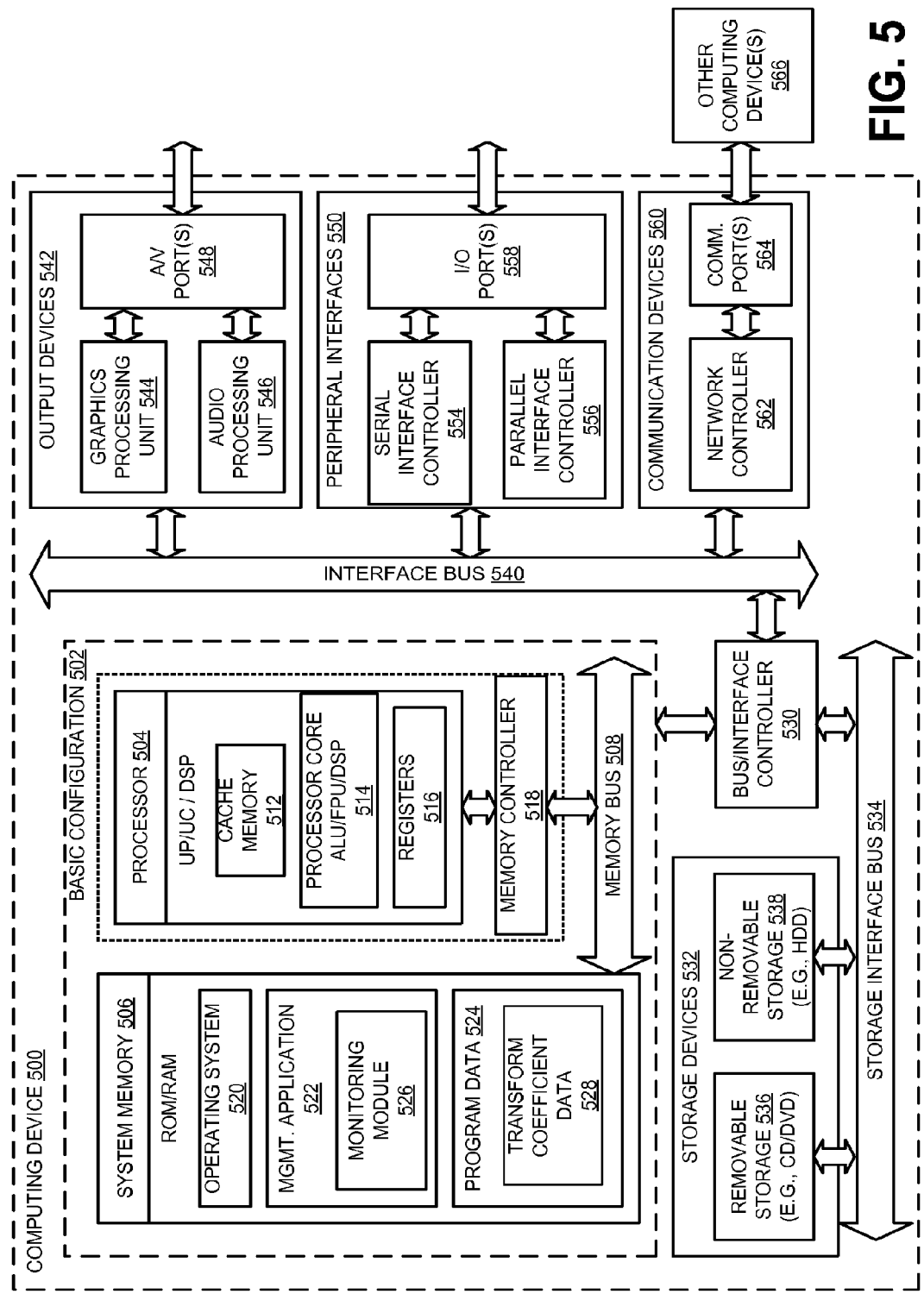
FIG. 5 illustrates a general purpose computing device, which may be used to implement scalable anomaly detection in cloud monitoring.

FIG. 5 illustrates a general purpose computing device 500, which may be used to implement scalable anomaly detection in cloud monitoring, arranged in accordance with at least some embodiments described herein. For example, the computing device 500 may be used to provide anomaly detection in a cloud environment using sparsity as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more management applications 522, and program data 524. The management applications 522 may include a monitoring module 526 for anomaly detection using sparsity in a histogram-based analysis as described herein. The program data 524 may include, among other data, administrative event data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for scalable and robust anomaly detection in cloud monitoring. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
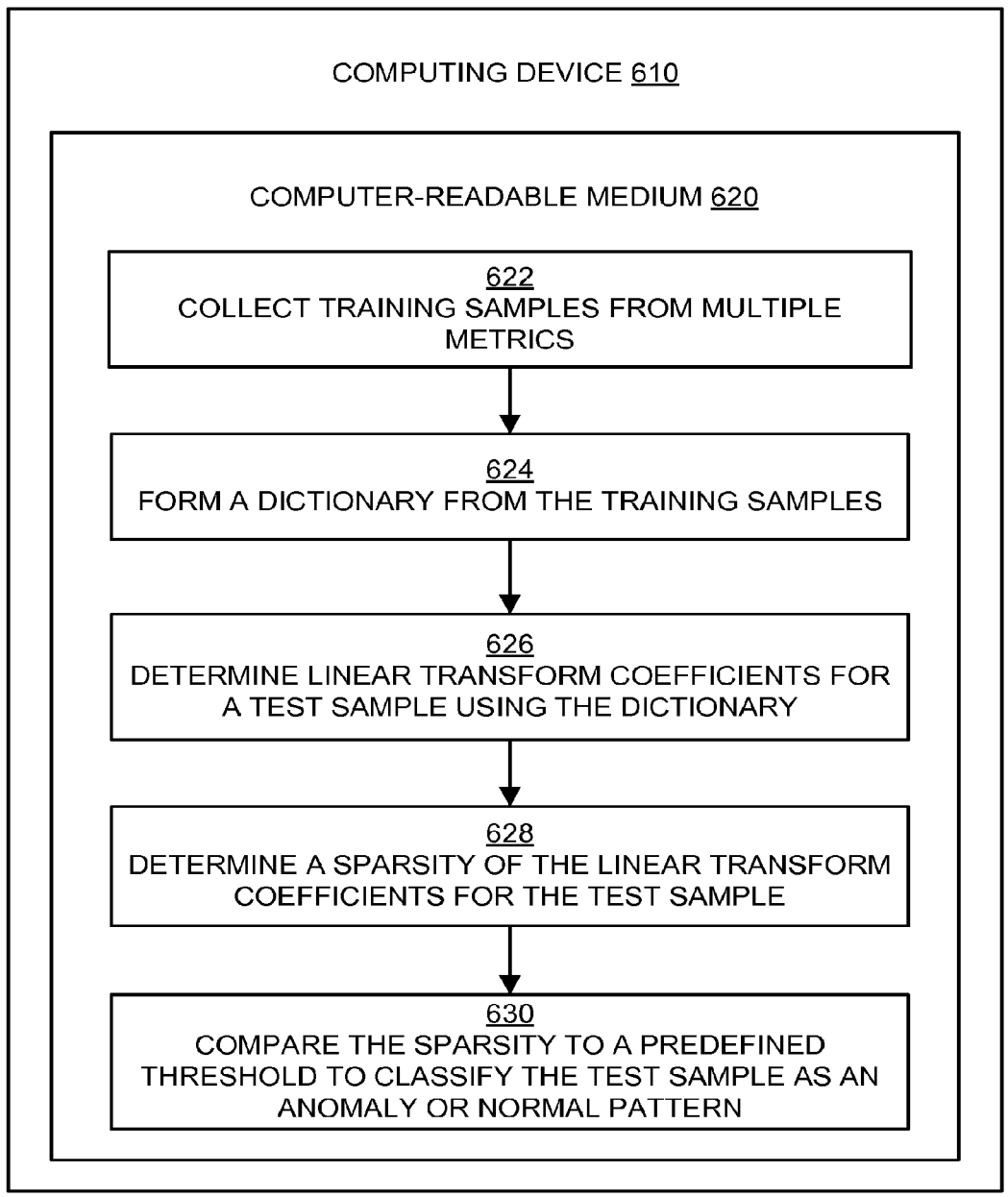
FIG. 6 is a flow diagram illustrating an example method that may be performed by a computing device such as the device in FIG. 5.

FIG. 6 is a flow diagram illustrating an example method for providing scalable and robust anomaly detection for cloud monitoring that may be performed by a computing device such as the computing device 500 in FIG. 5, arranged in accordance with at least some embodiments described herein. Example methods may include one or more operations, functions or actions as illustrated by one or more of blocks 622, 624, 626, 628, and/or 630, and may in some embodiments be performed by a computing device such as device 500 in FIG. 5. The operations described in the blocks 622-630 may also be stored as computer-executable instructions in a computer-readable medium such as a computer-readable medium 620 of a computing device 610.

An example process for providing scalable and robust anomaly detection for cloud monitoring may begin with block 622, "COLLECT TRAINING SAMPLES FROM MULTIPLE METRICS", where cloud metric sample values may be collected from various sources. The samples may include OS metrics (e.g., the OS metrics 432 in FIG. 4), application metrics (e.g., the application metrics 434 in FIG. 4), and/or platform metrics (e.g., the platform metrics 436 in FIG. 4). In some embodiments, metrics may include CPU load/usage, memory usage, network traffic, or any other relevant parameter or metric. In some embodiments, the collected training samples may be used to generate metric histograms, as described above in relation to FIG. 3.

Block 622 may be followed by block 624, "FORM A DICTIONARY FROM THE TRAINING SAMPLES", where the training samples collected in block 622 are used to form a dictionary base (e.g., as described in block 446 in FIG. 4). For example, training sample histograms may be stacked to form the dictionary base.

Block 624 may be followed by block 626, "DETERMINE LINEAR TRANSFORM COEFFICIENTS FOR A TEST SAMPLE USING THE DICTIONARY", where linear transform coefficients for a test sample histogram may be determined based on the dictionary base formed in block 624 (e.g., as described in block 448 in FIG. 4).

Block 626 may be followed by block 628, "DETERMINE A SPARSITY OF THE LINEAR TRANSFORM COEFFICIENTS FOR THE TEST SAMPLE", where a sparsity measure may be determined for the test sample linear transform coefficients determined in block 626. For example, a sparsity concentration index (SCI) may be computed for the test sample linear transform coefficients, as described above in block 450 of FIG. 4.

Finally, block 628 may be followed by block 630, "COMPARE THE SPARSITY TO A PREDEFINED THRESHOLD TO CLASSIFY THE TEST SAMPLE AS AN ANOMALY OR NORMAL PATTERN", where the sparsity measure determined in block 628 is compared to a predefined threshold. For example, as described in block 452 of FIG. 4, if the sparsity measure exceeds the threshold, the test sample may be classified as a normal pattern, and if the sparsity measure does not exceed the threshold, the test sample may be classified as an anomaly.

Figure 7:
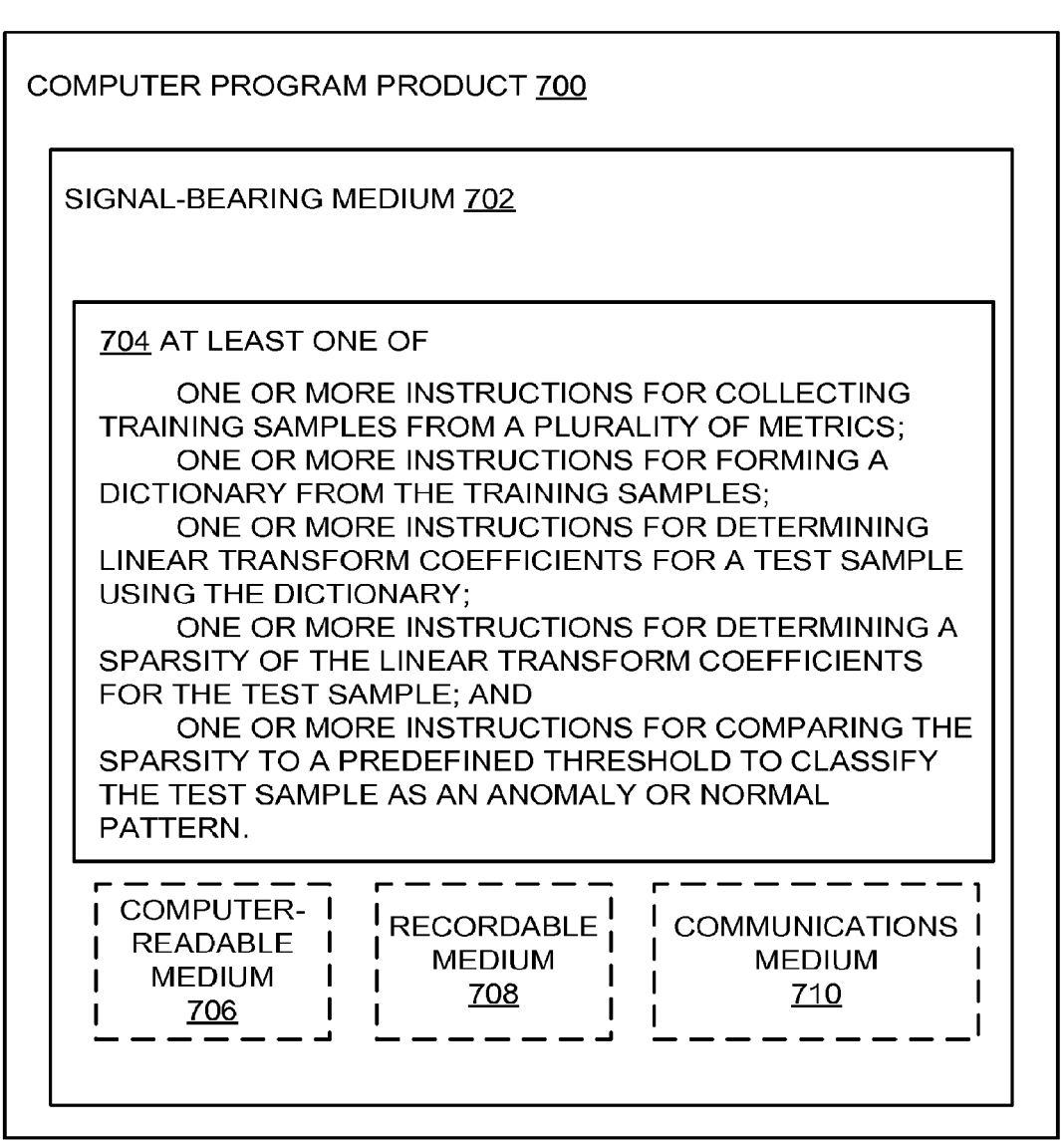
FIG. 7 illustrates a block diagram of an example computer program product; all arranged in accordance with at least some embodiments described herein.

FIG. 7 illustrates a block diagram of an example computer program product arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the management application 522 may undertake one or more of the tasks shown in FIG. 7 in response to the instructions 704 conveyed to the processor 504 by the medium 702 to perform actions associated with providing scalable and robust anomaly detection for cloud monitoring as described herein. Some of those instructions may include, for example, collecting training samples from multiple metrics, forming a dictionary from the training samples, determining linear transform coefficients for a test sample using the dictionary, determining a sparsity of the linear transform coefficients for the test sample, and comparing the sparsity to a predefined threshold to classify the test sample as an anomaly or normal pattern, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for detecting anomalies in cloud monitoring may include collecting training samples from multiple metrics associated with operations of a cloud-based entity, forming a dictionary from the training samples, determining linear transform coefficients for a test sample using the dictionary, determining a sparsity measure of the linear transform coefficients for the test sample, and classifying the test sample as an anomaly if the sparsity measure is below a predefined threshold.

According to some embodiments, the method may further include classifying the test sample as a normal pattern if the sparsity measure is above the predefined threshold, determining the linear transform coefficients based on minimizing a Euclidean distance between the test sample and the dictionary, minimizing an $l_1$-norm of the linear transform coefficients, and/or pre-processing the test sample prior to computing the linear transform coefficients.

According to other embodiments, the pre-processing may include normalizing a sample value by dividing the sample value by a mean of values of the same type in a current time instant, data-binning by hashing the normalized sample value into one of multiple bins, and constructing a metric histogram based on the binned value sample. The linear transform coefficients may be computed from the metric histogram. The data-binning may include predefining a value range [0, r], dividing the value range into B-1 substantially equal-sized bins indexed from 0 to B-2, and defining an additional bin indexed B-1 for capturing values larger than r, where B and r are statistically predefined, configurable parameters. An x-axis of the metric histogram may denote a bin index and a y-axis of the metric histogram may denote a percentage of the total sample values for an individual bin index. Each metric histogram may be a vector with its components being a percentage value at each bin index. The method may further include forming the dictionary by stacking multiple metric histogram vectors.

According to further embodiments, the method may further include employing a buffer to maintain the dictionary. The buffer may slide metric histograms one by one during a monitoring process. The method may further include evaluating the sparsity measure of the linear transform coefficients by computing a sparsity concentration index (SCI) as $$SCI(A) = \frac{N * \max_i \left( \frac{\delta_i(A)}{\delta(A)} \right) - 1}{N - 1},$$

where $\delta_i(A)$ returns a number of non-zero coefficients within $a_i = [a_{i,1}, a_{i,2}, \ldots a_{i,N}]$ corresponding to an $i^{th}$ dictionary element and $\delta(A)$ returns a total number of non-zero coefficients within A, linear transform coefficients vector for the test sample. The method may also include comparing the SCI to the predefined threshold, and the predefined threshold may be application-specific or user-defined.

According to yet other embodiments, the dictionary may be an over-complete dictionary. The multiple metrics may include operating system metrics, application metrics, and/or platform metrics. The method may further include computing the coefficients globally in terms of the training samples of normal patterns to harness a joint distribution of the normal patterns for validating whether the test sample is normal or not. The cloud-based entity may be a data center.

According to other examples, a cloud-based data center configured to detect anomalies in cloud monitoring may include multiple virtual machines operable to be executed on one or more physical machines and a data center controller. The data center controller may be configured to collect training samples from multiple metrics associated with operations of the data center, form a dictionary from the training samples, determine linear transform coefficients for a test sample using the dictionary, determine a sparsity measure of the linear transform coefficients for the test sample, and classify the test sample as an anomaly if the sparsity measure is below a predefined threshold.

According to some embodiments, the data center controller may be further configured to classify the test sample as a normal pattern if the sparsity measure is above the predefined threshold, determine the linear transform coefficients based on minimizing a Euclidean distance between the test sample and the dictionary, minimizing an $l_1$-norm of the linear transform coefficients, and/or pre-process the test sample prior to computing the linear transform coefficients.

According to other embodiments, the data center controller may be configured to pre-process by normalizing a sample value by dividing the sample value by a mean of values of the same type in a current time instant, data-binning by hashing the normalized sample value into one of multiple bins, and constructing a metric histogram based on the binned value sample. The linear transform coefficients may be computed from the metric histogram. The data-binning may include predefining a value range [0, r], dividing the value range into B-1 substantially equal-sized bins indexed from 0 to B-2, and defining an additional bin indexed B-1 for capturing values larger than r, where B and r are statistically predefined, configurable parameters. An x-axis of the metric histogram may denote a bin index and a y-axis of the metric histogram may denote a percentage of the total sample values for an individual bin index. Each metric histogram may be a vector with its components being a percentage value at each bin index. The data center controller may be further configured to form the dictionary by stacking multiple metric histogram vectors.

According to further embodiments, the data center controller may be further configured to employ a buffer to maintain the dictionary. The buffer may slide metric histograms one by one during a monitoring process. The data center controller may be further configured to evaluate the sparsity measure of the linear transform coefficients by computing a sparsity concentration index (SCI) as $$SCI(A) = \frac{N*\max_i\left(\frac{\delta_i(A)}{\delta(A)}\right) - 1}{N-1},$$

where $\delta_i(A)$ returns a number of non-zero coefficients within $a_i = [a_{i,1}, a_{i,2}, \ldots a_{i,N}]$ corresponding to an $i^{th}$ dictionary element and $\delta(A)$ returns a total number of non-zero coefficients within A, linear transform coefficients vector for the test sample. The data center controller may be further configured to compare the SCI to the predefined threshold, and the predefined threshold may be application-specific or user-defined.

According to yet other embodiments, the dictionary may be an over-complete dictionary. The multiple metrics may include operating system metrics, application metrics, and/or platform metrics. The data center controller may be further configured to compute the coefficients globally in terms of the training samples of normal patterns to harness a joint distribution of the normal patterns for validating whether the test sample is normal or not.

According to further examples, a computer-readable storage medium may store instructions for detecting anomalies in cloud monitoring. The instructions may include collecting training samples from multiple metrics associated with operations of a cloud-based entity, forming a dictionary from the training samples, determining linear transform coefficients for a test sample using the dictionary, determining a sparsity measure of the linear transform coefficients for the test sample, and classifying the test sample as an anomaly if the sparsity measure is below a predefined threshold.

According to some embodiments, the instructions may further include classifying the test sample as a normal pattern if the sparsity measure is above the predefined threshold, determining the linear transform coefficients based on minimizing a Euclidean distance between the test sample and the dictionary, minimizing an $l_1$-norm of the linear transform coefficients, and/or pre-processing the test sample prior to computing the linear transform coefficients.

According to other embodiments, the pre-processing may include normalizing a sample value by dividing the sample value by a mean of values of the same type in a current time instant, data-binning by hashing the normalized sample value into one of multiple bins, and constructing a metric histogram based on the binned value sample. The linear transform coefficients may be computed from the metric histogram. The data-binning may include predefining a value range [0, r], dividing the value range into B-1 substantially equal-sized bins indexed from 0 to B-2, and defining an additional bin indexed B-1 for capturing values larger than r, where B and r are statistically predefined, configurable parameters. An x-axis of the metric histogram may denote a bin index and a y-axis of the metric histogram may denote a percentage of the total sample values for an individual bin index. Each metric histogram may be a vector with its components being a percentage value at each bin index. The instructions may further include forming the dictionary by stacking multiple metric histogram vectors.

According to further embodiments, the instructions may further include employing a buffer to maintain the dictionary. The buffer may slide metric histograms one by one during a monitoring process. The instructions may further include evaluating the sparsity measure of the linear transform coefficients by computing a sparsity concentration index (SCI) as $$SCI(A) = \frac{N*\max_i\left(\frac{\delta_i(A)}{\delta(A)}\right) - 1}{N-1},$$

where $\delta_i(A)$ returns a number of non-zero coefficients within $a_i = [a_{i,1}, a_{i,2}, \ldots a_{i,N}]$ corresponding to an $i^{th}$ dictionary element and $\delta(A)$ returns a total number of non-zero coefficients within A, linear transform coefficients vector for the test sample. The instructions may also include comparing the SCI to the predefined threshold, and the predefined threshold may be application-specific or user-defined.

According to yet other embodiments, the dictionary may be an over-complete dictionary. The multiple metrics may include operating system metrics, application metrics, and/or platform metrics. The instructions may further include computing the coefficients globally in terms of the training samples of normal patterns to harness a joint distribution of the normal patterns for validating whether the test sample is normal or not. The cloud-based entity may be a data center.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for detecting anomalies in cloud monitoring, the method comprising:
   collecting training samples from a plurality of metrics associated with operations of a cloud based entity;
   forming a dictionary from the training samples;
   determining linear transform coefficients for a test sample using the dictionary;
   determining a sparsity measure of the linear transform coefficients for the test sample; and
   in response to a determination that the sparsity measure is below a predefined threshold, classifying the test sample as an anomaly.

2. The method according to claim 1, further comprising:
   in response to a determination that the sparsity measure is above the predefined threshold, classifying the test sample as a normal pattern.

3. The method according to claim 1, further comprising:
   determining the linear transform coefficients based on minimizing a Euclidean distance between the test sample and the dictionary and minimizing an h-norm of the linear transform coefficients at the same time.

4. The method according to claim 1, further comprising:
   pre-processing the test sample prior to computing the linear transform coefficients.

5. The method according to claim 4, wherein pre-processing includes:
   normalizing a sample value by dividing the sample value by a mean of values of the same type in a current time instant;
   data-binning by hashing the normalized sample value into one of a plurality of bins; and
   constructing a metric histogram based on the binned sample value.

6. The method according to claim 5, wherein the linear transform coefficients are computed from the metric histogram.

7. The method according to claim 6, wherein data binning comprises:
   predefining a value range [0, r];
   dividing the value range into B-1 substantially equal-sized bins indexed from 0 to B-2; and
   defining an additional bin indexed B-1 for capturing values larger than r, where B and r are statistically predefined, configurable parameters.

8. The method according to claim 7, wherein an x-axis of the metric histogram denotes a bin index and a y-axis of the metric histogram denotes a percentage of the total sample values for an individual bin index.

9. The method according to claim 8, wherein each metric histogram is a vector with its components being a percentage value at each bin index.

10. The method according to claim 9, further comprising:
    forming the dictionary by stacking a plurality of metric histogram vectors.

11. A cloud-based data center configured to detect anomalies in cloud monitoring, the cloud-based data center comprising:
    a plurality of virtual machines operable to be executed on one or more physical machines; and
    a data center controller configured to:
    collect training samples from a plurality of metrics associated with operations of the data center;
    form a dictionary from the training samples;
    determine linear transform coefficients for a test sample using the dictionary;
    determine a sparsity measure of the linear transform coefficients for the test sample;
    in response to a determination that the sparsity measure is below a predefined threshold classify the test sample as an anomaly; and
    in response to a determination that the sparsity measure is above the predefined threshold, classify the test sample as a normal pattern.

12. The data center according to claim 11, wherein the data center controller is further configured to:
    employ a buffer to maintain the dictionary.

13. The data center according to claim 12, wherein the buffer slides metric histograms one by one during a monitoring process.

14. The data center according to claim 11, wherein the data center controller is further configured to:
    evaluate the sparsity measure of the linear transform coefficients by computing a sparsity concentration index (SCI) as:

$$SCI(A) = \frac{N * \max_i \left(\frac{\delta_i(A)}{\delta(A)}\right) - 1}{N - 1},$$

where $\delta_i(A)$ returns a number of non-zero coefficients within $a_i=[a_{i,1}, a_{i,2}, \ldots a_{i,N}]$ corresponding to an $i^{th}$ dictionary element and $\delta(A)$ returns a total number of non-zero coefficients within A, linear transform coefficients vector for the test sample.

15. The data center according to claim 14, wherein the data center controller is further configured to:
    compare the SCI to the predefined threshold.

16. The data center according to claim 15, wherein the predefined threshold is one of application-specific and user-defined.

17. The data center according to claim 11, wherein the dictionary is an over-complete dictionary.

18. The data center according to claim 11, wherein the plurality of metrics includes one or more of operating system metrics, application metrics, and platform metrics.

19. The data center according to claim 11, wherein the data center controller is further configured to:
    compute the coefficients globally in terms of the training samples of normal patterns to harness a joint distribution of the normal patterns for validating whether the test sample is normal or not.

20. A non-transitory computer-readable storage medium having instructions stored thereon for detecting anomalies in cloud monitoring, the instructions comprising:
    collecting training samples from a plurality of metrics associated with operations of a cloud based entity;
    forming a dictionary from the training samples;
    determining linear transform coefficients for a test sample using the dictionary;
    determining a sparsity measure of the linear transform coefficients for the test sample;
    in response to a determination that the sparsity measure is below a predefined threshold classifying the test sample as an anomaly; and
    in response to a determination that the sparsity measure is above the predefined threshold, classifying the test sample as a normal pattern.

21. The non-transitory computer-readable storage medium according to claim 20, wherein the instructions further comprise:
    pre-processing the test sample prior to computing the linear transform coefficients by:
        normalizing a sample value by dividing the sample value by a mean of values of same type in a current time instant, data binning by hashing the normalized sample value into one of a plurality of bins, and constructing a metric histogram based on the binned sample value.

* * * * *

UNITED STATES PATENT AND TRADEMARK OFFICE
CERTIFICATE OF CORRECTION

PATENT NO. : 8,868,474 B2  
APPLICATION NO. : 13/997886  
DATED : October 21, 2014  
INVENTOR(S) : Leung et al.

It is certified that error appears in the above-identified patent and that said Letters Patent is hereby corrected as shown below:

On the Title Page, in Item (56), under "OTHER PUBLICATIONS", in Column 2, Line 1, delete "et al" and insert -- et al., --, therefor.

On the Title Page, in Item (56), under "OTHER PUBLICATIONS", in Column 2, Line 2, delete "internationai" and insert -- international --, therefor.

On Title Page 2, in Item (56), under "OTHER PUBLICATIONS", in Column 1, Lines 1-2, delete "et al "Hisogram-based traffic anomaly detection," IEEE Tansactons on Nework and Sevice Management" and insert -- et al., "Histogram-based traffic anomaly detection," IEEE Transactions on Network and Service Management, --, therefor.

On Title Page 2, in Item (56), under "OTHER PUBLICATIONS", in Column 2, Line 1, delete "et al" and insert -- et al., --, therefor.

On Title Page 2, in Item (56), under "OTHER PUBLICATIONS", in Column 2, Line 7, delete "et al," and insert -- et al., --, therefor.

On Title Page 2, in Item (56), under "OTHER PUBLICATIONS", in Column 2, Line 8, delete "vol," and insert -- vol. --, therefor.

On Title Page 2, in Item (56), under "OTHER PUBLICATIONS", in Column 2, Line 9, delete "et al," and insert -- et al., --, therefor.

In the Drawings

In Fig. 5, Sheet 5 of 7, delete "UP/UC/DSP" and insert -- $\mu P/\mu C/DSP$ --, therefor.

Signed and Sealed this  
Second Day of June, 2015

Michelle K. Lee  
*Director of the United States Patent and Trademark Office*

CERTIFICATE OF CORRECTION (continued)
U.S. Pat. No. 8,868,474 B2

In the Specification

In Column 1, Lines 6-8, delete "This....371." and insert -- The present application is a U.S. national stage filing under 35 U.S.C. §371 of International Application No. PCT/US12/49101, filed on Aug. 1, 2012, the entire contents of which are incorporated herein by reference. --, therefor.

In Column 3, Line 61, delete "shortcoming" and insert -- shortcoming. --, therefor.

In Column 5, Line 63, delete "xk+1, xk+1," and insert -- xk, xk+1, --, therefor.

In Column 6, Line 56, delete "$\delta_i(A)$" and insert -- $\delta(A)$ --, therefor.

In Column 9, Line 34, delete "interfaces 544," and insert -- interfaces 550, --, therefor.

In Column 9, Line 35, delete "566)" and insert -- 560) --, therefor.

In Column 9, Line 37, delete "unit 548" and insert -- unit 544 --, therefor.

In Column 9, Line 38, delete "unit 550," and insert -- unit 546, --, therefor.

In Column 9, Line 41, delete "interfaces 544" and insert -- interfaces 550 --, therefor.

In Column 9, Line 47, delete "device 566" and insert -- device 560 --, therefor.

In Column 9, Line 47, delete "controller 560," and insert -- controller 562, --, therefor.

In Column 9, Line 49, delete "devices 562" and insert -- devices 566 --, therefor.

In Column 9, Line 51, delete "devices 562" and insert -- devices 566 --, therefor.

In Column 15, Line 20, delete "(e.g.,as" and insert -- (e.g., as --, therefor.

In Column 15, Line 24, delete "and or" and insert -- and/or --, therefor.

In the Claims

In Column 18, Line 3, in Claim 3, delete "h-norm" and insert -- $1_1$-norm --, therefor.